United States Patent
Certain et al.

(10) Patent No.: US 10,853,194 B1
(45) Date of Patent: Dec. 1, 2020

(54) SELECTIVE DATA RESTORATION

(71) Applicant: Amazon Technologies, Inc., Seattle, WA (US)

(72) Inventors: Tate Andrew Certain, Seattle, WA (US); Vaibhav Govil, Issaquah, WA (US); Go Hori, Seattle, WA (US); Akshat Vig, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 15/812,901

(22) Filed: Nov. 14, 2017

(51) Int. Cl.
| | |
|---|---|
| G06F 16/00 | (2019.01) |
| G06F 11/14 | (2006.01) |
| G06F 16/22 | (2019.01) |
| G06F 16/2455 | (2019.01) |

(52) U.S. Cl.
CPC ...... *G06F 11/1469* (2013.01); *G06F 16/2282* (2019.01); *G06F 16/24568* (2019.01); *G06F 2201/80* (2013.01)

(58) Field of Classification Search
CPC .................................................. G06F 16/2282
See application file for complete search history.

(56) References Cited

U.S. PATENT DOCUMENTS

2013/0042156 A1* 2/2013 Srinivasan .......... G06F 11/1443
714/54

OTHER PUBLICATIONS

Jerry Cochran, "Detecting and Repairing Logical Corruption of Your Exchange Server Databases," ITPrp Microsoft Exchange Collaboration, Jun. 5, 2000, pp. 1-5.
"Logical Corruption (Indexes)," downloaded from http://www.online-database.eu/index.php/backup-a- recovery/60-logical-corruption on Oct. 26, 2017, pp. 1-6.
"Logical Corruption (IOT) Detection and Solution," downloaded from http://www.online-database.eu/index.php/backup-a-recovery/174-logical-corruption-iot-detection-and-resolution on Oct. 26, 2017, pp. 1-6.
Oracle, "Maximum Availability Architecture," White Paper: Preventing, Detecting, and Repairing Block Corruption: Oracle Database 11g, May 2012, pp. 1-17.

* cited by examiner

*Primary Examiner* — Ajith Jacob
(74) *Attorney, Agent, or Firm* — Robert C. Kowert; Kowert, Hood, Munyon, Rankin & Goetzel, P.C.

(57) ABSTRACT

A selective data restoration technique is disclosed. A request to recover data in a dataset is received along with an identifier of a particular portion of the data to be recovered. The request may specify a time that indicates a desired recovery state (e.g., recover the values as they were at the time). Change data is determined for the specified time. For example, data stream filters generate recovery data by applying filters (e.g., keys) to a time window batch of the stream data. The stream data may correspond to changes to a data set, and the recovery data may correspond to only a portion of the dataset (e.g., a portion of a table). The system performs a recovery action, based on the recovery data, using the recovery data to automatically restore data in a data store, or providing the recovery date to the requesting entity, for example.

19 Claims, 8 Drawing Sheets

Recovery Console 142

Tab A | Tab B

*Recovery Time Window*
2017-10-31 00:00:00
2017-11-01 00:00:00

*Recovery Keys*
9G, 42L, C, E

*Recovery Automation Level*
○ Fully-automated recovery
● Recovery selection interface
○ Manual Recovery (respond to request with recovery data)

*Filter Results [old image:new image]*
Entry 9G: 2017-10-31 01:04:23 [Jeff:Geoff]
Entry 42L: 2017-10-31 03:01:58 [Karm:Karen]
Entry C: 2017-10-31 04:22:31 [Smith:Smitch]
Entry 9G: 2017-10-31 05:00:32 [Geoff:Geoffrey]
Entry E: 2017-10-31 23:57:42 [Ron:Ronald]

Change Entry: C
Change Date-Time: 2017-10-31 04:22:31

● Smith [Old Entry Image]
○ Smitch [New Entry Image]

[<<Prior Entry]  [Next Entry >>]

● I grant permission to the system to make the above-noted changes

[Proceed With Recovery]

FIG. 8

SELECTIVE DATA RESTORATION

BACKGROUND

For various reasons, owners of data may desire to return, rollback or recover their data to a prior state. Topics as diverse as data corruption, and software testing can benefit from a data system that can restore or rollback data to a particular state or to a particular point in time.

In a particular example, electronic data corruption (e.g., intended or unintended errors in computer data that occur during writing, reading, storage, transmission, or processing, which introduce unintended changes to the original data) can happen for any number or reasons. The corruption can happen in entirety (e.g., an entire table) or partially (e.g., part of the table), can be systematic or random, and even a small change can fundamentally break a program or render a file useless.

In one example, logical corruption may occur when a user erroneously updates stored items (e.g., items in a database table). Restoring corrupt data can be a time-intensive, multi-step process. For example, some restore or rollback techniques, such as point-in-time recovery require restoration or rollback of the entire set of data (e.g., of an entire table). In some instances, to restore corrupt data, corrupt items are determined by performing a full restore (e.g., a full restore may include a search or scan through all of the data (e.g., an entire table)). Performing a full search for corrupt data can take an undesirable amount of time, multiple hours or longer, such as for a database of terabyte scale/petabyte scale, for example. In another example, performing a full restore based on a terabyte/petabyte scale snapshot can take hours or longer.

In some instances, instead of restoring corrupt data for the entire dataset, a client may desire to roll back just a portion of the data. For example, a client may wish to roll back changes for a portion of the dataset that was updated during a time window, a portion of the dataset that was changed without permission, a portion of the dataset that was breached in a cyberattack, or the like. Performing partial restores or roll backs are not possible for systems that restore or roll back by performing full restores.

DETAILED DESCRIPTION

Various embodiments of selective data restoration are disclosed. In data processing, changes to a dataset (e.g., changes to a table in a database) are sometimes recorded in a log (sometimes referred to as stream data, in embodiments). The log may be used to restore the dataset back to a point in time. In some systems, a point-in-time restoration is performed by using log records to walk back all of the changes up to the specified point in time. An alternative restoration technique is to replace the entire dataset with a snapshot from an earlier point in time. But such a technique reverts the entire dataset back to the specified point in time and the associated processing can put a costly strain on resources.

For instance, in some systems, restoration of data (e.g., corrupted data) requires analysis of the entirety of the dataset (e.g., an entire table or some similar grouping of related data) to determine all of the corrupt data. For example, to perform a restoration of corrupt data on a table, a system may search and restore data on the existing live table, or a system may copy the table data into a new table, determine the corrupt items in the new table (e.g., via search, query, scan, etc.), estimate the correct entries in the new table, and restore the data into the original table based on the estimated correct entries of the copy of the table. This process can be lengthy and may unnecessarily tie up resources to perform the restoration at least because it processes the entire table.

Described herein are systems and techniques for selective data restoration or replacement. For instance, it may be desirable to cause a portion of a dataset (e.g. portion of a grouping of correlated data, such as, but not limited to a table in a database) to be restored to prior values for that portion of the dataset, without restoring prior values for the other portion of the dataset. In embodiments, the disclosed technique leverages data streams that report changes to datasets to create logs or stream data of the changes, distinct from the dataset. For example, a disclosed system and technique may use stream filters to recover from corruption without performing a full restore of the dataset, thereby reducing the amount of processing required to perform the recovery. Application of the techniques disclosed herein are contemplated to be applicable to other types of changing datasets (e.g., collections of data) than tables, documents are one non-limiting example).

In embodiments disclosed herein, a restoration process may be limited to a portion of data (e.g., changes that happened during a period of time, or for a certain key range, etc.). For example, a system may generate a temporally sequenced index of the changes to the data as the changes are reported. For a recovery request that specifies a particular time window, the system would not need to search the entire data store, but could instead search the smaller index of changes. In embodiments, restoration processing may be limited to a portion of the data based on other keys in addition to time. In just a few non-limiting examples, the portion of the data may be specified for restoration based on identifying the data that is associated with a particular system or process, based on identifying the data that is associated with a particular customer, or based on a primary or range key (e.g. hash key), etc., for example.

In embodiments, the system may be configured to restore a portion of the data, while keeping other changes made to the remaining portion of the data. For example, the system may be configured to allow a client to rollback changes made to a particular set of customer information in a table to the values at 5 P.M on a particular day, while retaining the changes made to other customer information in that table subsequent to 5 P.M. on the same day, all without searching the table directly.

Stream filters may filter time window batches of stream data or logs to generate recovery data. At least in embodiments where a data stream service maintains a temporal sequence of the changes to the dataset, a time window batch of the stream data can be searched using a particular key to identify updates to the dataset for the specific key (the time window batch identified based on applying the specified time to the stream data or log). Searching the time window batch, instead of the dataset directly, can reduce the amount of processing time required to perform a restore or replacement, in embodiments. Such techniques can support restoration of a portion of the dataset, without having to search the entire dataset (e.g., without having to search an entire table) to identify the data to be restored.

In one example, the system may play the changes to the data from the recovery data backwards to reverse the changes back to the original data in the data set. In another example, the system may directly restore the data to a known state at a point in time, based on a record of the value of the data at that point in time that was included in the stream data. Other restoration techniques are contemplated, such as providing the change record to the requesting client and providing an interface for the client to perform the restoration (e.g., so that the owner can control the restore).

Stream filters provide a way to search for updates done to a table for a specific key within a specified time window. For instance, the search can return a set of records and each record can have the old image of the item (before the update) and new image of the item (after the update). The system may provide both the old image and new images for those items, which may be selectable via user interface elements for restoration. Alternatively, restoration may be performed automatically (without requiring selection of the preferred image for the items), in embodiments.

This specification begins with a general description of a system that implements selective data restoration, as a network-based service in a multi-tenant provider network, for example. Then, various examples of selective data restoration are discussed, including different services, managers, consoles, interfaces and filters, or arrangements of services, managers, consoles, interfaces and filters that may be implemented and which may perform selective data restoration. A number of different methods and techniques to implement selective data restoration and replacement are then discussed, some of which are illustrated in accompanying flowcharts. Finally, a description of an example computing system upon which the various components, modules, systems, devices, and/or nodes may be implemented is provided. Various examples are provided throughout the specification.

Figure 1:
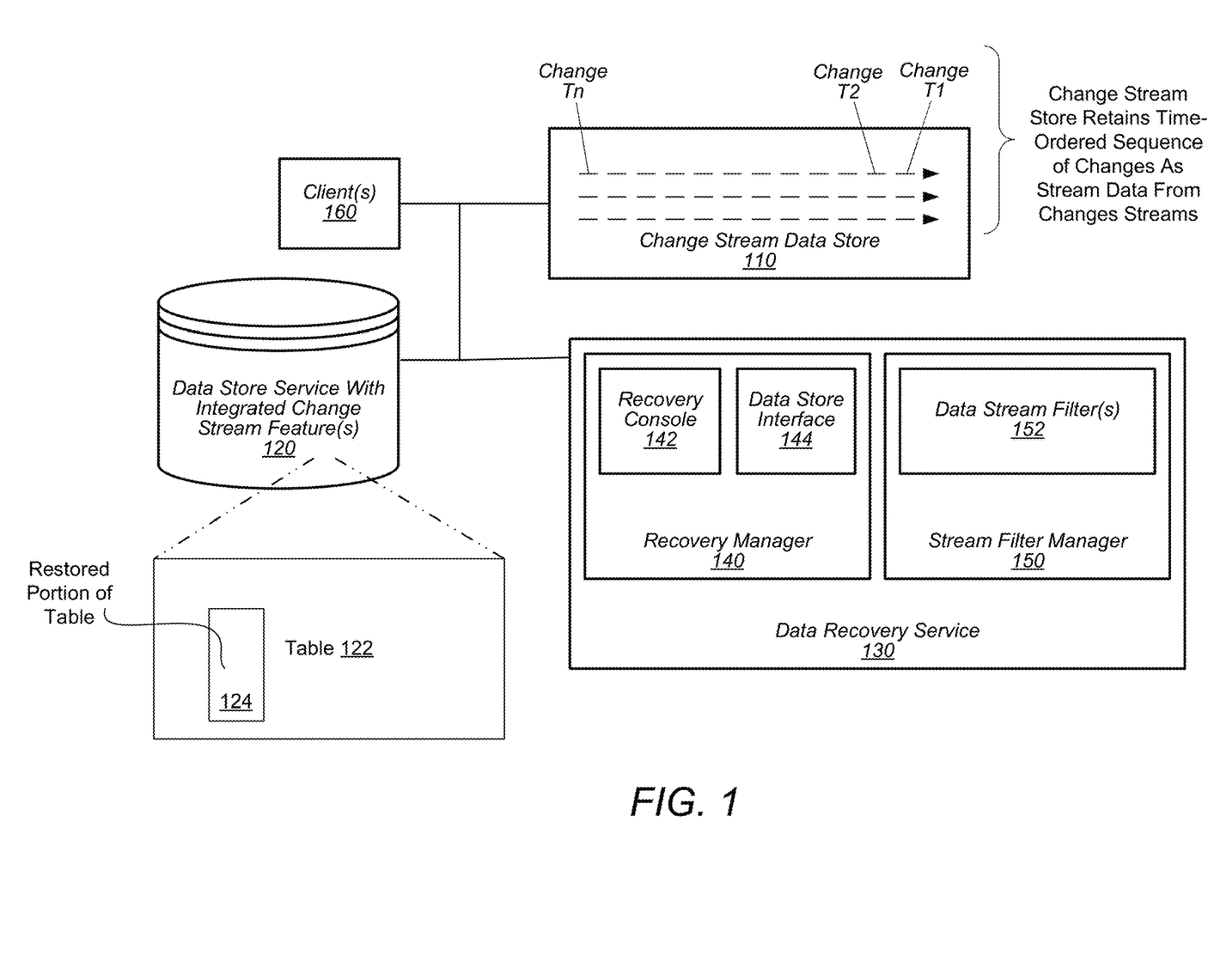
FIG. 1 illustrates a system that includes a data recovery service that recovers data based on a change index generated from streaming data, according to at least some embodiments.

FIG. 1 illustrates a system that includes a data recovery service that recovers data based on a change index generated from streaming data, according to at least some embodiments. Various components of FIG. 1 may perform some of the steps illustrated in the processes depicted in FIGS. 2-5 and described below. As an example, data recovery service 130 may perform steps illustrated in FIGS. 2-5. The steps depicted in FIGS. 2-5 and described below may be performed by other entities, illustrated or otherwise, in embodiments.

FIG. 1 illustrates a data store service with integrated change stream features 120 that includes a table 122 and a portion of the table 124. Client(s) 160 are illustrated and may include, as just a few non-limiting examples, remote clients of a service provider, applications operating on a service provider network (e.g., client applications or native service provider applications), other services of the service provider, or services of another service provider, etc. In embodiments, the data store may be a NoSQL database.

Change stream data store 110 is illustrated with storage for stream data from data streams. The stream data may include changes to data in a data store and may the changes may be stored in such a way as to retain the temporal sequence (e.g., T1, T2 . . . Tn) of the changes.

Change Streams

Data store 120 is illustrated as having integrated change stream features. Some streams may maintain a temporal order. For example, a stream associated with changes to a particular client's table of data may maintain a time-based sequence of the changes. In some embodiments, a customer may be associated with one or more streams. Each stream may be associated with a single partition or shard, in embodiments. A partition or shared be identified by a key.

In one particular example of a data stream, a changes stream is a time-ordered flow of information about changes to items in a dataset (e.g., changes to items in a table). For example, by enabling a change stream on a table, the streaming service captures information about every modification to data items in the table. In some embodiments, a change stream captures a time-ordered sequence of item-level modifications in any table, and stores this information in a log or in stream data for a configurable amount of time. Applications can access this log and view the data items as they appeared before and after they were modified, in near real time, in some embodiments, for example.

In embodiments, whenever an application creates, updates, or deletes items in a dataset such as a table, the stream service writes a stream record with the primary key attribute(s) of the items that were modified. A stream record may contain information about a data modification to a single item in a table (e.g., information, such as the "before" and "after" images of modified items). In some embodiments, a stream service guarantees that each stream record appears exactly once in the stream (e.g., deduplicated).

In some embodiments, a stream service guarantees that, for each item that is modified (e.g., an item modified in a table), the stream records appear in the same temporal sequence as the actual modifications to the item. For example, a streaming service may guarantee item-level ordering by relying on the master copy for a replicated item. In some embodiments, item-level ordering may be guaranteed for a partition.

Other types of system are contemplated without departing from the scope of the disclosure. For example, some data streams may not include the old and the new image of the item. In some embodiments, a data stream may only provide the difference between the old and new image for the item. Backup data (e.g., backup data at a particular point in time, such as a snapshot) may be relied upon to provide a sufficient history of the data to perform recovery, in some instances. For instance, a change index built (e.g., from the diffs in the streaming data) from the streaming data may be used in conjunction with a backup data source to determine the recovered data. In some embodiments, to determine the recovered data, the service may start with a data item from a backup (e.g., a snapshot) and then replay the updates from the data stream up to the point in time for which the recovery was desired.

A change stream may include changes from a number of different shards of the data store, in embodiments.

Figure 2:
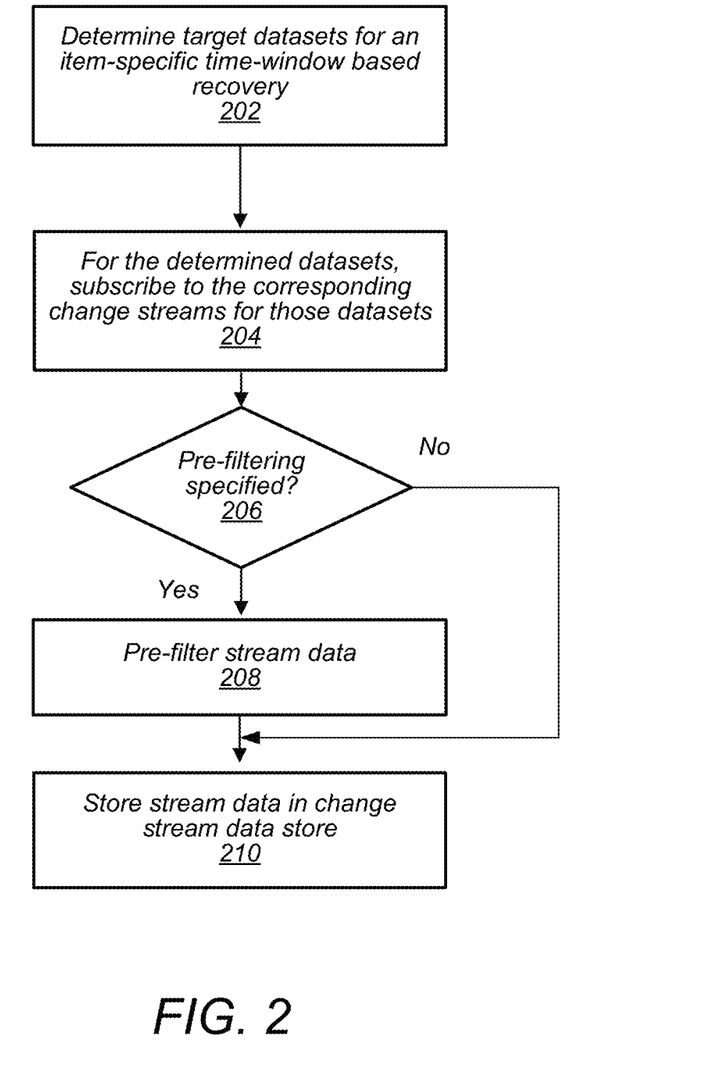
FIG. 2 is a flow chart illustrating a technique for defining stream filters that filter stream data and storing the stream data, according to one embodiment.

Data recovery service 130 is illustrated with recovery manager 140 and stream filter manager 150. Recovery manager 140 may implement features of the selective recovery technique disclosed herein. For example, recovery console 143 (illustrated in FIG. 7, described below) of the data recovery service 130 may provide an interface for configuring features of the recovery service (e.g., Tab B may implement user interface elements for determining target datasets for an item-specific time window based recovery as illustrated in FIG. 2) as well as an interface for use to participate in a data selection process (e.g., illustrated in FIG. 7 and in blocks 410-418 of FIG. 4). Data store interface 144 provides an interface for the recovery manager to perform recovery or replacement or restoration operations on the data in the data store 120, in embodiments.

Stream filter manager 150 is configured to generate and manage steam filter(s) 152, in embodiments. For example, the system may use one or more default or pre-configured stream filters. In another example the system may generate a stream filter (e.g., based on the technique illustrated in FIG. 2, for example.

FIG. 2 is a flow chart illustrating a technique for defining stream filters that filter stream data and storing the stream data, according to one embodiment. The data stream filter manager 150 may perform one of more of the illustrated steps of FIG. 2, in embodiments. At block 202 target datasets are determined for an item-specific time-window based recovery. The system subscribes to the corresponding change streams for the determined datasets (block 204). If pre-filtering is specified (block 206, yes) the stream data is pre-filtered. For example, the system may pre-filter to reduce amount of stream data (e.g., filter out data that would never be included in filter) or may actually perform the filtering ahead of time. In embodiments, the filtering can be performed later, such as at the time of the request. If pre-filtering is not specified (block 206, no) or subsequent to performing the pre-filtering, as illustrated in block 208, the stream data is stored in the change stream data store 210.

In embodiments, the filtering may be performed using keys such as primary keys and the system may support multiple types of primary keys, such as a partition key: also known as a hash key. The partition key is composed of a single attribute, in embodiments. Attributes may be similar to fields or columns in other database systems, in embodiments. Another example of a primary key is a composite primary key or hash-range key, this type of key is composed of two attributes, in embodiments. The first attribute is the partition key, and the second attribute is the sort key, for example.

Figure 3:
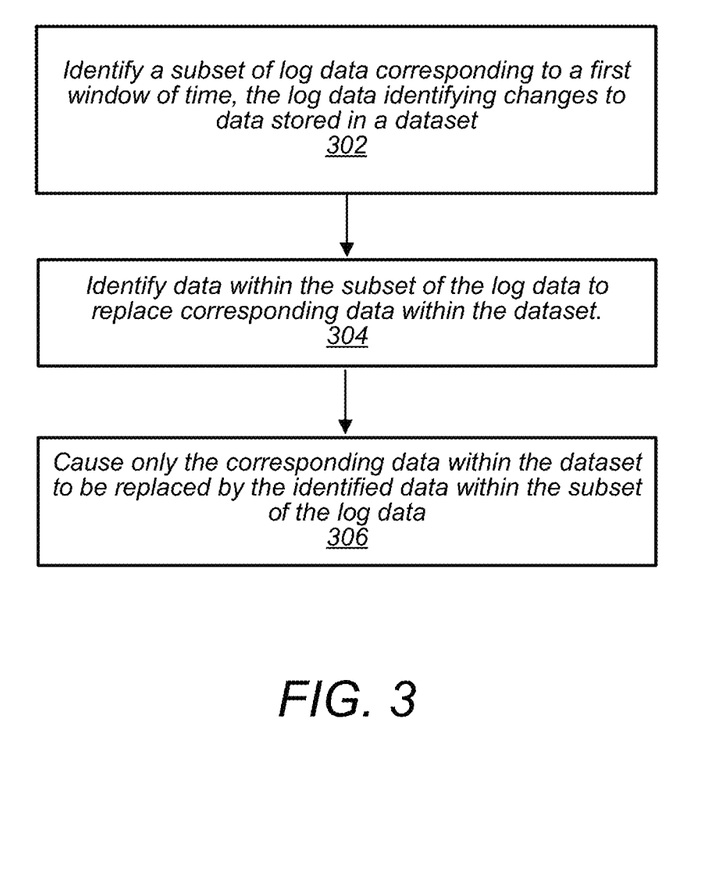
FIG. 3 is a flow chart illustrating a technique for selective data replacement, according to at least some embodiments.

FIG. 3 is a flow chart illustrating a technique for selective data replacement, according to at least some embodiments. In some embodiments, various steps disclosed herein may be performed prior to the disclosed steps. For example, a request specifying a portion of data and a time may be received prior to the step at block 302. At block 302, a subset of log data corresponding to a first window of time is identified, the log data identifying one or more changes to data stored in a data set. At block 304, data within the subset of the log data is identified to replace corresponding data within the dataset. As an explicit alternative to the order illustrated in blocks 302 and 304, in at least some embodiments, the identification of data corresponding to a time window may be performed after identifying a subset of the log data (e.g., based on application of a key to the log data).

At block 306, only the corresponding data within the dataset is caused to be replaced by the identified data within the subset of the log data. For example, the replacement of data in the dataset may be limited to only those values that correspond to the identified data. Replacement may be limited for the replacement operation only, in embodiments. For example, the data of the dataset may be updated based on receipt of subsequent operations distinct from the operation that initiated the step at block 302, in embodiments, while still causing only the corresponding data within the dataset to be replaced by the identified data within the subset of the log data. For example, if the step at block 302 was initiated based on receipt of a replacement request, the data of the dataset may be updated based on receipt of a subsequent request, while still causing only the corresponding data within the dataset to be replaced by the identified data within the subset of the log data. The "only" limitation may be limited to the replacement operation, in embodiments.

Figure 4:
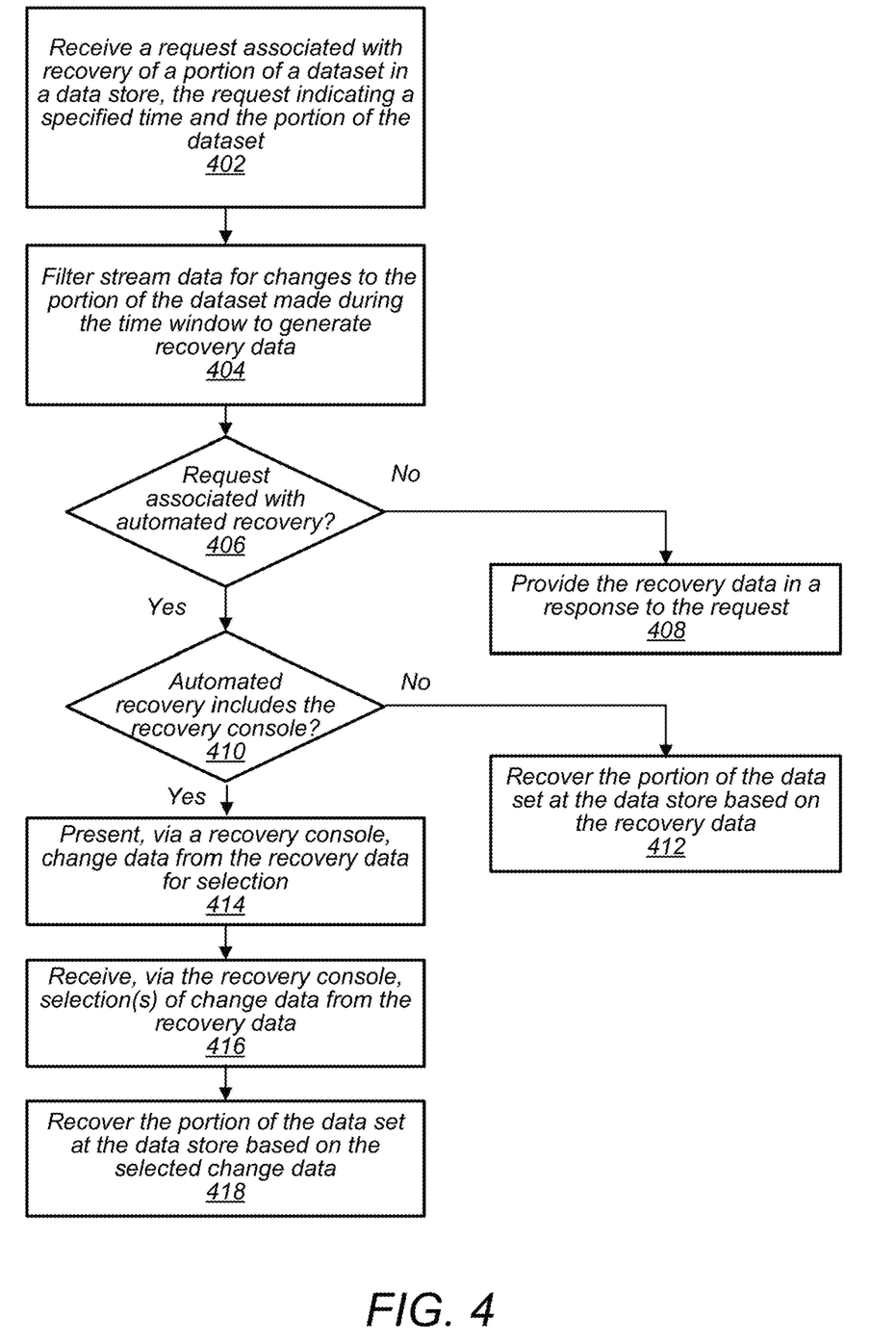
FIG. 4 is a flow chart illustrating a technique for data recovery service that recovers data based on a time window batches of data generated from streaming data, according to at least some embodiments.

FIG. 4 is a flow chart illustrating a technique for data recovery service that recovers data based on a time window batches of data generated from streaming data, according to at least some embodiments. At block 402, a request associated with recovery of a portion of a dataset in a data store is received, the request indicating a specified time and the portion of the dataset. Stream data is filtered for changes to the portion of the dataset made during the time window to generate recovery data (block 404). If the request is not associated with automated recovery (diamond 406, no) and the automated recovery does not include the recovery console (block 410, no), the portion of the data is recovered at the data store based on the recovery data (block 412). Otherwise (diamond 410, yes) change data from the recovery data is presented via the recovery console (block 414). Selections of change data from the recovery data are received via the recovery console (block 416), and the portion of the data set is recovered at the data store based on the selected change data (block 418).

Figure 5:
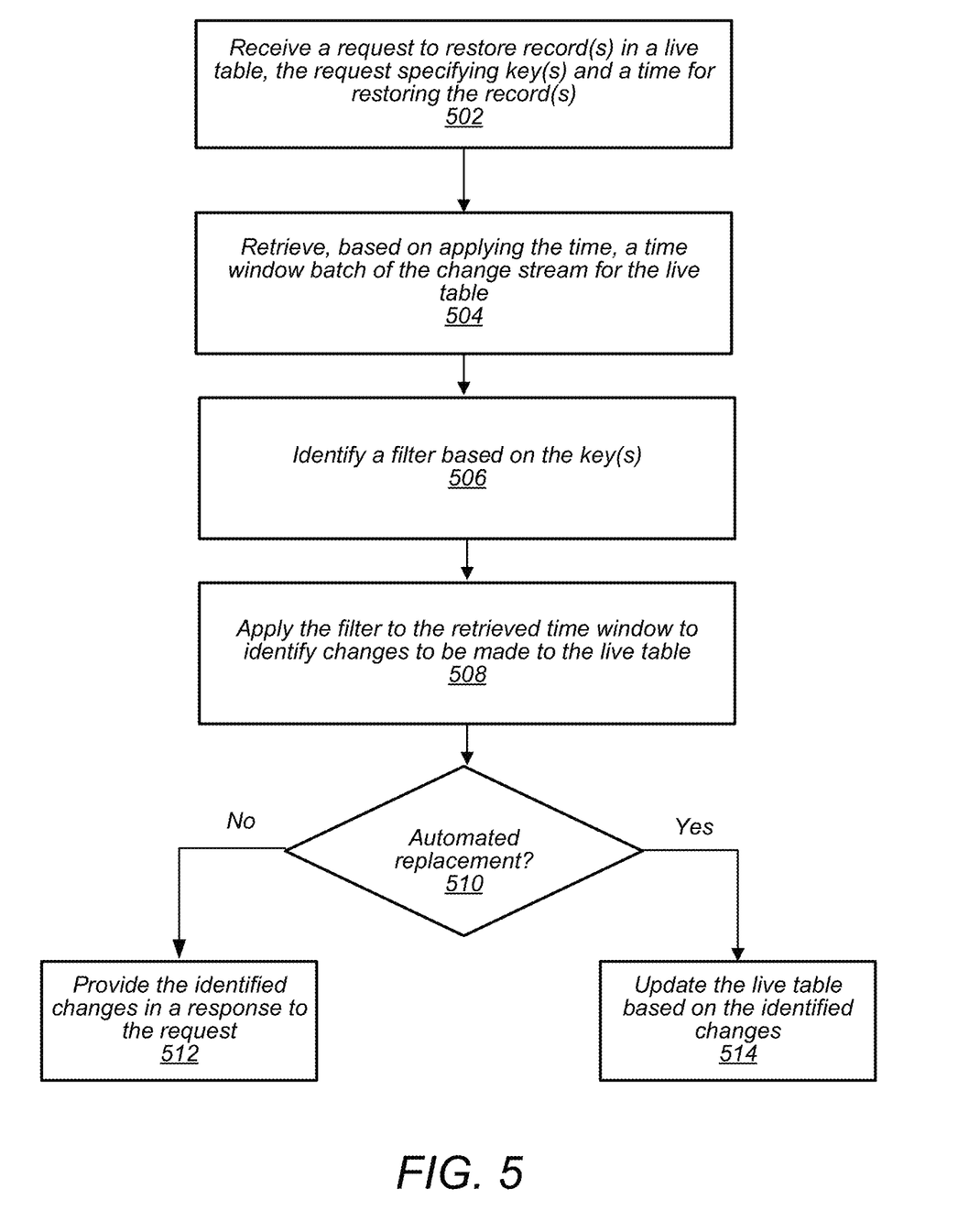
FIG. 5 is a flow chart illustrating a technique for recovering data in a table, according to one embodiment.

FIG. 5 is a flow chart illustrating a technique for recovering data in a table, according to one embodiment. The illustrated technique may be performed by a data recovery service like that illustrated in FIG. 1, in embodiments. At block 502, a request to restore record(s) in a live table are received, the request specifying key(s) and a time for restoring the record(s). Based on applying the time, a time window batch of the change stream for the live table is retrieved (block 504). A filter is identified, based on the key(s) (block 506) and the filter is applied to the retrieved time window to identify changes to be made to the live table (block 508). If automated replacement is specified (block 510, yes) the live table is updated based on the identified changes (block 514). Otherwise (block 510, no) the identified changes are provided in response to the request (block 512). It is contemplated that similar techniques are applicable to collections of data (e.g., other datasets).

Figure 6:
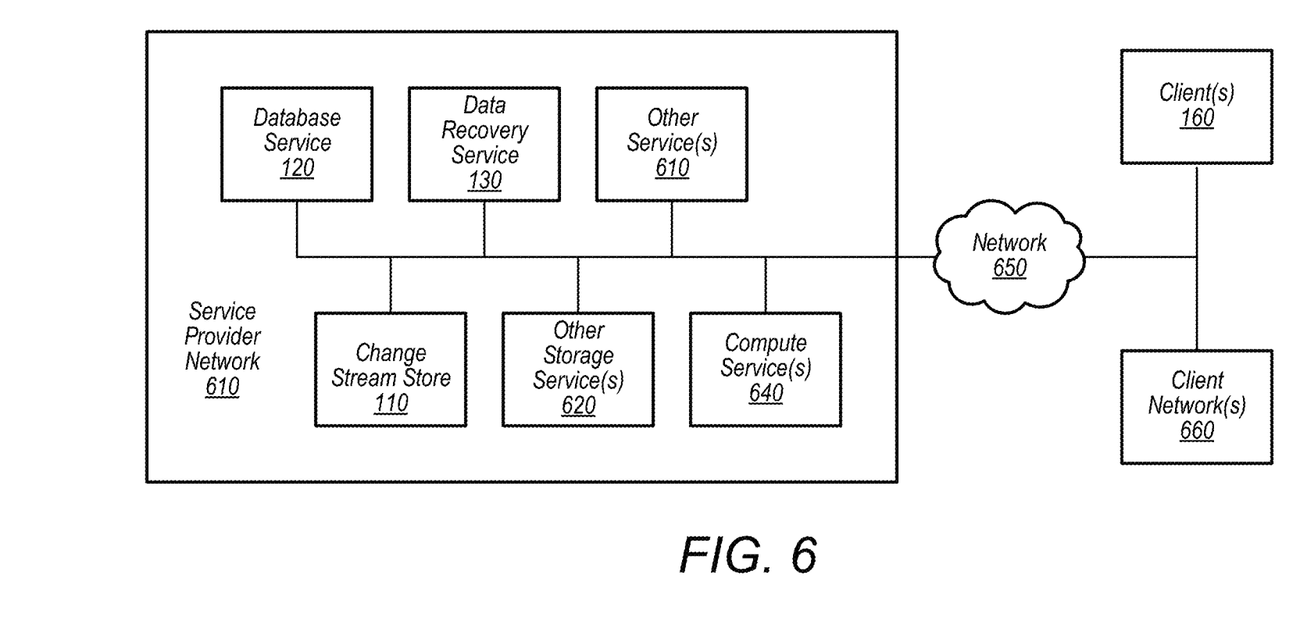
FIG. 6 illustrates a multi-tenant service provider system that provides a data recovery service, according to one embodiment.

FIG. 6 illustrates a multi-tenant service provider system that provides a data recovery service, according to one embodiment. Service provider network 610 may be a multi-tenant service provider that provides service over network 650 (e.g., the Internet or a combination of private and public networks) to multiple distinct clients 160 and/or client networks 660, in embodiments. Service provider network 610 is illustrated with database service 120 (e.g., database service 120, also illustrated in FIG. 1), change stream store 110 (e.g., change steam store 110, also illustrated in FIG. 1), and data recovery service 130 (e.g., data recovery service 130, also illustrated in FIG. 1). FIG. 6 illustrates that these components may be part of a service provider network that provides other services 610, other storage service 620 and compute services 640, for example.

Figure 7:
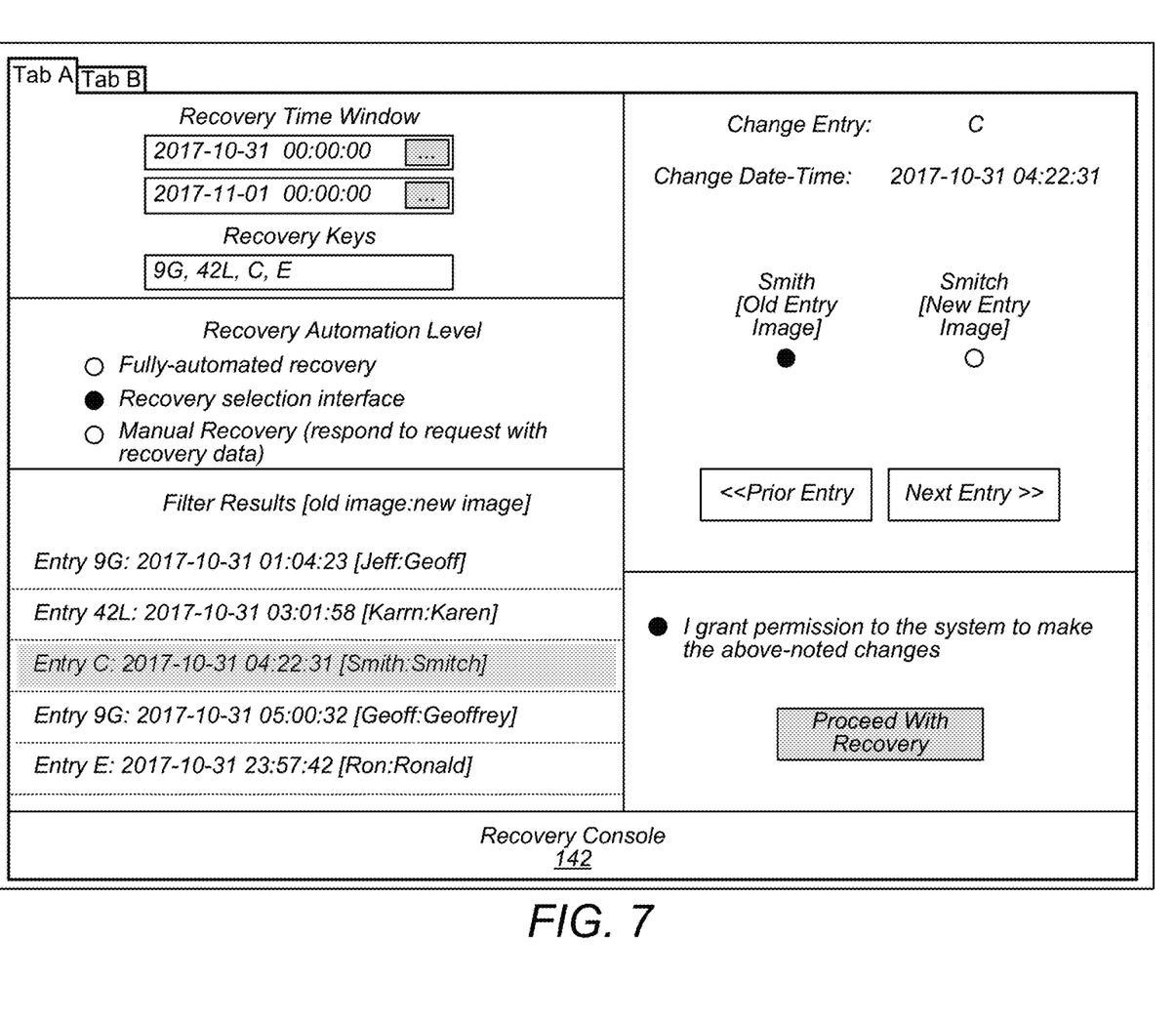
FIG. 7 depicts an example implementation of a data recovery console, according to at least some embodiments.

FIG. 7 depicts an example implementation of a data recovery console, according to at least some embodiments. FIG. 7 illustrates Tab A and Tab B. Tab A is illustrated with recovery time window user interface elements, recovery automation level user interface elements, filter results user interface elements, as well as other user interface elements. Tab B may be associated with other user interface elements (e.g., not illustrated) such as a console (e.g., a configuration console) for configuring custom filters. In embodiments, Tab B may include user interface elements that accept entry of configuration data (e.g., from an administrator or from a customer user, or the like, etc.)

FIG. 7 illustrates input user interface elements for inputting time associated with a recovery. Although both beginning and endpoints may be specified for a time window. A starting point may be sufficient to perform recovery operations, in some embodiments. For example, the system may use the current time as the default endpoint for a time window and the time specified in the user interface element as the start time for the window.

The recovery console 142 is also illustrated with user interface elements for entering recovery keys. One or more recovery keys may be specified, as illustrated in FIG. 7. Filter results are illustrated in the lower left corner of the recovery console in FIG. 7. For example, the filter results illustrate two changes for entry 9G, in temporal sequence. Entry C is highlighted in the recovery console to illustrate that entry as selected, with details of the entry depicted in user interface elements in the upper right corner of the recovery console 142. An old entry image ("Smith") for entry C is illustrated as selected with a black dot user interface element, and the new entry image (Smitch") for entry C being left unselected. Prior entry and next entry user interface elements are illustrated and may be used to navigate through the filter results to make selections for each entry. The lower right corner of the recovery console 142 illustrates a user interface element for a user to grant permission to the system to make the recovery changes on behalf the user (given that the user has permission to perform changes to the data).

Figure 8:
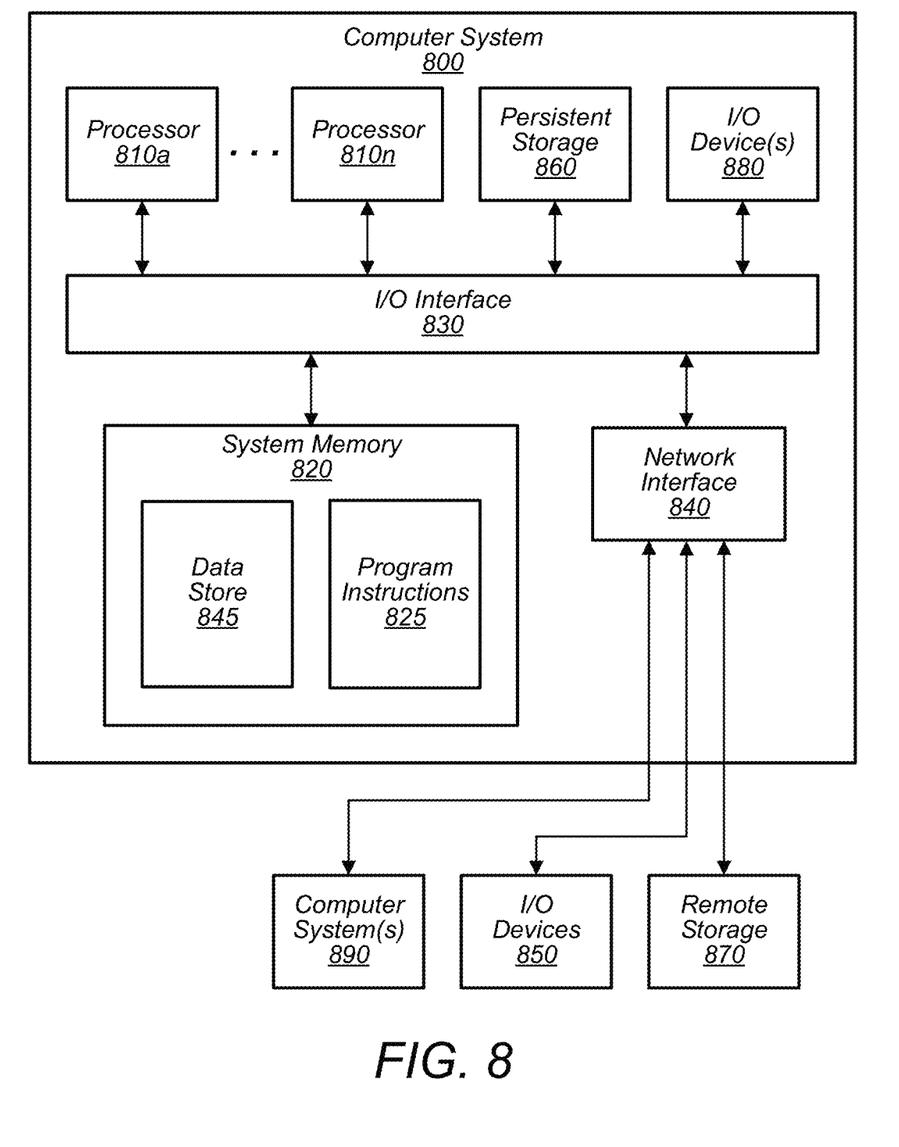
FIG. 8 is a block diagram illustrating a computer system configured to implement at least a portion of a system that includes a task service, worker fleet, and resources, according to various embodiments.

Any of various computer systems may be configured to implement processes associated with a system that implements selective data restoration. For example, FIG. 8 is a block diagram illustrating one embodiment of a computer system suitable for implementing some or all of the techniques and systems described herein. For example, each of the computer systems may host one or more database services, data recovery services, change stream stores, or other services, such as those in the multi-tenant service provider network 610, for example. In some cases, a host computer system may host multiple virtual instances that implement database service 120, data recovery service 130, change stream store 110 or any of the services 610, 620, 640 of the multi-tenant service provider network 610. However, the techniques described herein may be executed in any suitable computer environment (e.g., a cloud computing environment, as a network-based service, in an enterprise environment, etc.).

Various of the illustrated embodiments may include one or more computer systems 800 such as that illustrated in FIG. 8 or one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing service provider logic, enterprise logic or downloadable applications, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above for are for downloadable software or for a provider network and are shown stored within system memory 820 as program instructions 824. In some embodiments, system memory 820 may include data 825 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as between a client device (e.g., 780) and other computer systems, or among hosts (e.g., hosts of a service provider network 710), for example. In particular, network interface 840 may be configured to allow communication between computer system 800 and/or various other device 860 (e.g., I/O devices). Other devices 860 may include scanning devices, display devices, input devices and/or other communication devices, as described herein. Network interface 840 may commonly support one or more wireless networking protocols (e.g., Wi-Fi/IEEE 802.7, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device (e.g., cursor control device, keyboard, or display(s) may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the change stream store 110, data store 120, data recovery service 130, resources or components of the service provider network 610, other various services, data stores, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   a change stream store implemented via one or more hardware processors and memory, wherein the change stream store receives and stores stream data from data streams corresponding to respective datasets in a data store;
   a data recovery service implemented via one or more hardware processors and memory, the data recovery service to:
   receive a request to restore data in a dataset, the request specifying a portion of the dataset and a time;
   retrieve, based on application of the time, a time-window batch of the stream data for the dataset;
   identify restoration data for the specified portion of the dataset via selection of a subset from the time-window batch of the stream data; and
   perform a restore action based on the identified restoration data.

2. The system of claim 1, wherein:
   to specify the portion of the dataset, the request specifies one or more keys; and
   to identify restoration data for the specified portion of the dataset, the data recovery service is implemented to filter the time-window batch based on the one or more keys specified in the request.

3. The system of claim 2, wherein
   the portion of the dataset in the data store comprises a portion of a live table in a database;
   the stored stream data from the data streams correspond to changes to the live table in the database; and
   the restore action comprises restoring data in the portion of the live table using the identified restoration data.

4. The system of claim 1, wherein to perform the restore action based on the identified restoration data, the data recovery service is implemented to:
   provide recovery console for display of both an old image and a new image for one or more of the identified restoration data;
   receive selection of the old image or the new image for the one or more of the identified restoration data; and
   update the dataset in the data store according to the one or more selections.

5. A method, comprising:
   receiving a request to restore data in a dataset, wherein the request specifies a subset of the dataset and a time that indicates a first window of time;
   identifying, based at least in part on the first window of time, a subset of log data corresponding to the first window of time, wherein the log data identifies changes to data stored in the dataset;
   identifying data within the subset of the log data to replace corresponding data within the dataset; and
   causing only the corresponding data within the dataset to be replaced by the identified data within the subset of the log data.

6. The method as recited in claim 5, wherein said identifying the subset of log data corresponding to the first window of time comprises identifying a time window batch of a change stream in a change stream store that receives and stores stream data from data streams corresponding to respective datasets in a data store.

7. The method as recited in claim 6, wherein
   said identifying data within the subset of the log data to replace corresponding data within the dataset comprises:
   presenting, via a recovery console, change data from the time window batch for selection, wherein the presented change data comprises a prior image and an existing image for an item in the dataset; and
   receiving, via the recovery console, one or more selections, wherein the one or more selections indicate either replacement of the existing image with the prior image, or no replacement of the existing image;
   wherein said causing only the corresponding data within the dataset to be replaced by the identified data within the subset of the log data comprises causing the replacement in accordance with the one or more selections.

8. The method as recited in claim 5, wherein said identifying the data within the subset of the log data to replace corresponding data within the dataset comprises filtering the subset of log data corresponding to the first window of time to identify the data used to replace the corresponding data.

9. The method as recited in claim 8, wherein filtering the subset of the log data corresponding to the first window of time includes filtering the subset of the log data using one or more keys.

10. The method as recited in claim 9, wherein the one or more keys comprise a partition key, or a hash-range key.

11. The method as recited in claim 5, further comprising:
    determining one or more target datasets for an item-specific time window based recovery;
    for the determined one or more target datasets, subscribe to the corresponding one or more change streams for those datasets; and
    store stream data from the one or more changes streams in a change stream data store.

12. The method as recited in claim 5, wherein:
    the dataset comprises a live table in a database; and said causing only the corresponding data within the dataset to be replaced comprises automatically restoring respective entries in the live table with the identified data.

13. A non-transitory computer readable storage medium storing program instructions that, when executed by a computer, cause the computer to:
receive a request to restore data in a dataset, wherein the request specifies a subset of the dataset and a time that indicates a window of time;
identify a subset of log data, wherein the log data identifies changes to data stored in the dataset;
identify, based at least in part on the window of time, a time window batch of the subset of log data that corresponds to the window of time; and
perform a restore action based on the identified time window batch.

14. The non-transitory computer readable storage medium of claim 13, wherein to identify the subset of log data that identifies changes to data stored in the dataset, the program instructions further cause the computer to:
filter the log data for the dataset based on one or more keys specified in the request.

15. The non-transitory computer readable storage medium of claim 13, wherein to identify the subset of log data that identifies changes to data stored in the dataset, the program instructions further cause the computer to:
filter the log data for the dataset based on a partition key, or a hash-range key.

16. The non-transitory computer readable storage medium of claim 13, wherein to perform a restore action based on the identified time window batch the program instructions further cause the computer to:
present, via a recovery console, the time window batch for selection, wherein the presented time window batch comprises an old image and a new image for an item in the time window batch; and
receive, via the recovery console, one or more selections, wherein the one or more selections indicate either no restoration for that item, or restoration of the item with the old image for that item; and
restore, based on the one or more selections, the corresponding data in the dataset in the data store.

17. The non-transitory computer readable storage medium of claim 13, wherein to perform said identify the subset of log data, said identify the time window batch, and said perform the restore action based on the identified time window batch, the program instructions further cause the computer to:
perform each of said identify the subset, said identify the time-window batch, and said restore without searching the dataset in the data store.

18. The non-transitory computer readable storage medium of claim 13, wherein to perform the restore action based on the identified time window batch the program instructions further cause the computer to:
restore, based on the identified time window batch, corresponding data in the dataset of the data store.

19. The non-transitory computer readable storage medium of claim 18, wherein to restore, based on the identified time window batch, corresponding data in the dataset of the data store, the program instructions further cause the computer to:
enforce one or more permissions that restrict changes to the dataset in the data store, wherein enforce the one or more permissions comprises:
obtain permission to perform the restore from an entity with the permission, and
prevent the restore when valid permission is not obtained.

* * * * *